(12) United States Patent
Salter et al.

(10) Patent No.: US 10,322,754 B2
(45) Date of Patent: Jun. 18, 2019

(54) PILLAR MOLDING WITH IMPROVED SCRATCH RESISTANCE

(71) Applicant: Ford Global Technologies, LLC, Dearborn, MI (US)

(72) Inventors: Stuart C. Salter, White Lake, MI (US); Chester Stanislaus Walawender, Livonia, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 6 days.

(21) Appl. No.: 15/631,557

(22) Filed: Jun. 23, 2017

(65) Prior Publication Data

US 2018/0370574 A1 Dec. 27, 2018

(51) Int. Cl.
*B62D 25/04* (2006.01)
*B60R 25/23* (2013.01)
*B29C 45/14* (2006.01)
*B62D 29/04* (2006.01)
*B29K 55/02* (2006.01)
*B29K 69/00* (2006.01)
*B29K 33/20* (2006.01)
*B29K 709/08* (2006.01)
*B29L 31/30* (2006.01)

(52) U.S. Cl.
CPC ........ *B62D 25/04* (2013.01); *B29C 45/14311* (2013.01); *B29C 45/14434* (2013.01); *B62D 29/043* (2013.01); *B29K 2033/20* (2013.01); *B29K 2055/02* (2013.01); *B29K 2069/00* (2013.01); *B29K 2709/08* (2013.01); *B29L 2031/3041* (2013.01); *B60R 25/23* (2013.01)

(58) Field of Classification Search
CPC ...... B62D 25/04; B62D 29/043; B60R 25/23; B29C 45/14311; B29C 45/14434; B29K 2033/20; B29K 2055/02; B29K 2069/00; B29K 2709/08; B29L 2031/3041
See application file for complete search history.

(56) References Cited

U.S. PATENT DOCUMENTS

| 6,734,253 B2 | 5/2004 | Krabbenborg et al. |
| 7,790,795 B2 | 9/2010 | Schauder et al. |
| 9,085,219 B2 | 7/2015 | Wade et al. |

(Continued)

FOREIGN PATENT DOCUMENTS

| CN | 103030887 | 4/2013 |
| WO | 2016007815 | 1/2016 |

*Primary Examiner* — Gregory A Blankenship
(74) *Attorney, Agent, or Firm* — Carlson, Gaskey & Olds, P.C.

(57) ABSTRACT

An apparatus, according to an exemplary aspect of the present disclosure includes, among other things, a base comprised of a plastic material and having an exterior surface and an interior surface. At least one layer of ion treated glass is attached to the exterior surface and at least one input device is mounted to the base. A method according to an exemplary aspect of the present disclosure includes, among other things, providing at least one layer of ion treated glass in a desired shape, molding a plastic body to one side of the ion treated glass such that an opposite side of the ion treated glass forms a vehicle exterior surface, and assembling at least one input device to the plastic body.

23 Claims, 2 Drawing Sheets

(56) References Cited

U.S. PATENT DOCUMENTS

| | | | |
|---|---|---|---|
| 9,802,554 B1* | 10/2017 | Schulze zur Wiesche | B60R 13/04 |
| 2002/0073518 A1* | 6/2002 | Chesson | B60J 5/0411 |
| | | | 24/455 |
| 2004/0130182 A1* | 7/2004 | Bangle | B32B 5/24 |
| | | | 296/180.5 |
| 2010/0052361 A1* | 3/2010 | Tortosa-Boonacker | B62D 35/005 |
| | | | 296/180.1 |
| 2010/0296303 A1* | 11/2010 | Sarioglu | E05B 17/10 |
| | | | 362/487 |
| 2012/0032463 A1* | 2/2012 | Gerndorf | B60R 11/0235 |
| | | | 296/1.08 |
| 2014/0141217 A1* | 5/2014 | Gulati | C03C 3/091 |
| | | | 428/212 |
| 2015/0343752 A1 | 12/2015 | Gasworth | |
| 2015/0360646 A1* | 12/2015 | Pribisic | B60R 25/2045 |
| | | | 340/5.54 |
| 2017/0050616 A1* | 2/2017 | Liubakka | G07C 9/00309 |
| 2017/0139506 A1* | 5/2017 | Rodriguez | B29C 45/14688 |
| 2018/0062649 A1* | 3/2018 | Salter | B60R 25/23 |

* cited by examiner

PILLAR MOLDING WITH IMPROVED SCRATCH RESISTANCE

TECHNICAL FIELD

This disclosure relates to an exemplary apparatus and method of providing an input device that is part of a vehicle body structure that comprises a plastic material molded to a layer of ion treated glass.

BACKGROUND

Vehicles have pillar sections that are typically covered with an applique having a glossy surface to provide an aesthetically pleasing appearance. Often these pillar locations include keyless entry keypads that are incorporated internally of the outer glossy surface. This type of glossy surface is subject to micro scratches from environmental conditions such as dust, debris, car washes, and everyday handling by users. Finger touch requirements of keyless entry buttons further aggravates the situation. Additionally, sink marks in the surface can form over time due to pressing the buttons. The scratches and sink marks can result in a surface that is not aesthetically pleasing.

SUMMARY

An apparatus according to an exemplary aspect of the present disclosure includes, among other things, a base comprised of a plastic material and having an exterior surface and an interior surface. At least one layer of ion treated glass is attached to the exterior surface and at least one input device is mounted to the base.

In a further non-limiting embodiment of the foregoing apparatus, the input device comprises a keypad.

In a further non-limiting embodiment of either of the foregoing apparatus, the base comprises a vehicle pillar.

In a further non-limiting embodiment of any of the foregoing apparatus, the vehicle pillar comprises a B pillar.

In a further non-limiting embodiment of any of the foregoing apparatus, the plastic material comprises one of ABS, ASA, or PC/ASA material.

In a further non-limiting embodiment of any of the foregoing apparatus, the base includes a lip that is formed over an edge of the ion treated glass.

In a further non-limiting embodiment of any of the foregoing apparatus, the apparatus includes a layer of transparent film between the exterior surface of the base and the layer of ion treated glass.

In a further non-limiting embodiment of any of the foregoing apparatus, the interior surface includes at least one mount structure, and wherein the input device is assembled to the mount structure.

In a further non-limiting embodiment of any of the foregoing apparatus, the base includes at least one window opening, and wherein the input device is mounted to face the window opening.

In a further non-limiting embodiment of any of the foregoing apparatus, the apparatus includes a foam seal attached to the interior surface adjacent to the input device.

An apparatus according to another exemplary aspect of the present disclosure includes, among other things, a vehicle pillar body having an exterior surface and an interior surface, at least one layer of ion treated glass attached to the exterior surface, and at least one input device mounted to the interior surface.

In a further non-limiting embodiment of any of the foregoing apparatus, the input device comprises a keypad that is aligned with a window opening formed within the pillar body such that the keypad is user accessible by pressing against the layer of ion treated glass.

In a further non-limiting embodiment of any of the foregoing apparatus, the pillar body includes a lip that is formed over an edge of the ion treated glass to hold the ion treated glass against the pillar body, and including a foam seal attached to the interior surface adjacent to the keypad.

A method according to another exemplary aspect of the present disclosure includes the steps of, among other things: providing at least one layer of ion treated glass in a desired shape, molding a plastic body to one side of the ion treated glass such that an opposite side of the ion treated glass forms a vehicle exterior surface, and assembling at least one input device to the plastic body.

In a further non-limiting embodiment of the foregoing method, the method includes molding a lip around an edge of the ion treated glass to hold the layer of ion treated glass against the plastic body.

In a further non-limiting embodiment of either of the foregoing methods, the input device comprises a keypad, and the method includes forming a window opening in the plastic body, aligning the keypad with the window opening, and attaching the keypad to the plastic body.

In a further non-limiting embodiment of any of the foregoing methods, the method includes attaching a foam seal to the plastic body adjacent to the keypad.

In a further non-limiting embodiment of any of the foregoing methods, the plastic body comprises a vehicle pillar.

In a further non-limiting embodiment of any of the foregoing methods, the method includes plasma treating the layer of ion treated glass prior to molding.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary apparatus and methods of providing an input device that is part of a vehicle body structure that comprises a plastic material molded to a layer of ion treated glass. These and other features are discussed in greater detail in the following paragraphs of this detailed description.

Figure 1:
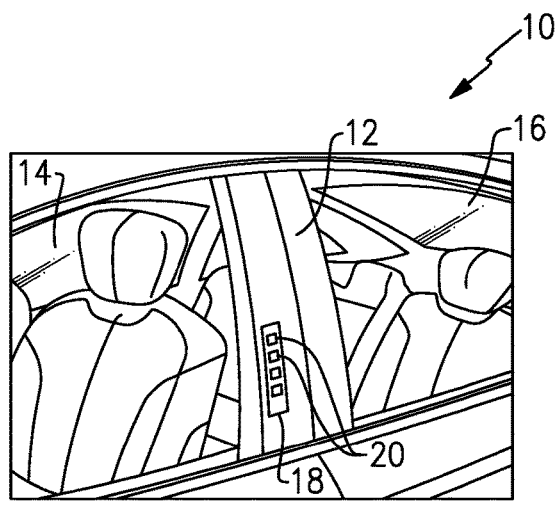
FIG. 1 schematically illustrates a B-pillar section of a vehicle with a keyless entry keypad.

FIG. 1 shows a vehicle 10 that includes a B-pillar 12 that is positioned between a driver side front window 14 and a driver side rear window 16. The B-pillar 12 includes an input device 18, such as a keyless entry keypad for example. The input device 18 includes one or more actuation members 20 such as buttons, pads, switches, etc., for example.

Figure 2:
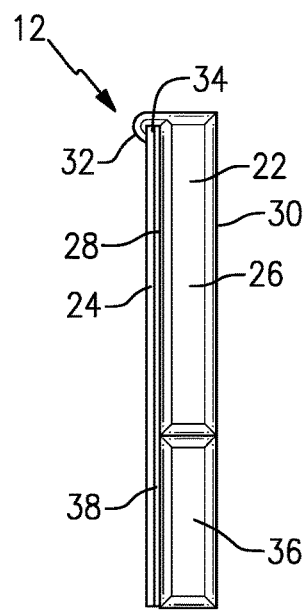
FIG. 2 schematically illustrates one example of a cross-section of a vehicle pillar having a plastic material molded onto a layer of ion treated glass.

As shown in FIG. 2, the subject invention provides a pillar structure 12 for the input device 18 that comprises a plastic material 22 molded onto a layer of ion treated glass 24, which results in a pillar structure 12 that is robust and scratch resistant. It should be understood that while a B-pillar 12 is shown in FIG. 1 as an example, the plastic material 22/ion treated glass 24 structure with the input device 18 could also be located at other areas of the vehicle.

In one example, the pillar structure 12 comprises a base 26 that has an exterior surface 28 that faces outwardly of the vehicle 10 and an interior surface 30 that faces a passenger compartment. The layer of ion treated glass 24 is placed over the exterior surface 28. The base 26 is formed of the plastic material 22 which is insert molded onto the layer of ion treated glass 24 to provide strength and rigidity to the pillar structure 12. Further, the molding captures and seals the glass 24 for mounting. In one example, the base 26 includes a lip 32 that is molded around an edge 34 of the layer of ion treated glass 24 to securely hold the glass 24 against the base 26 and to protect the edges 34 from chipping. Fully supporting the glass 24 by over-molding significantly increases impact strength.

In one example, transparent acrylic material is insert molded in a second shot to provide an area 36 for hidden actuation members 20 that can be lit from behind for viewing. Optionally, a thin transparent layer of film 38 can be applied to an interior side of the ion treated glass 24 prior to the over-mold to provide a desired color while allowing the actuation members 20 to show through when lit.

Figure 3:
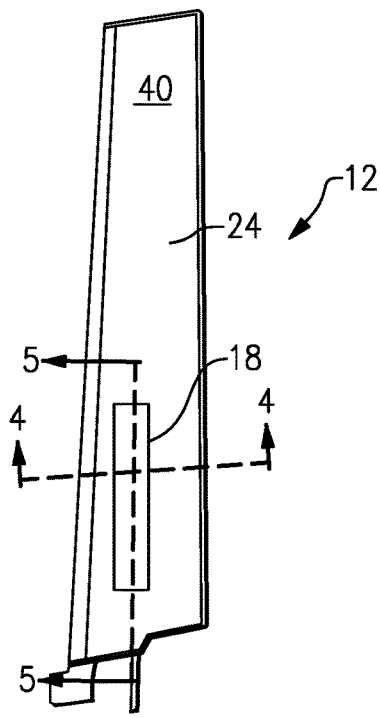
FIG. 3 is a side view of the subject invention forming a B-pillar and keypad assembly.
Figure 4:
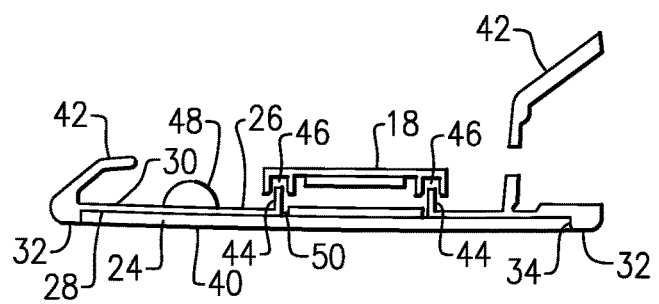
FIG. 4 is a section view as identified in FIG. 3.
Figure 5:
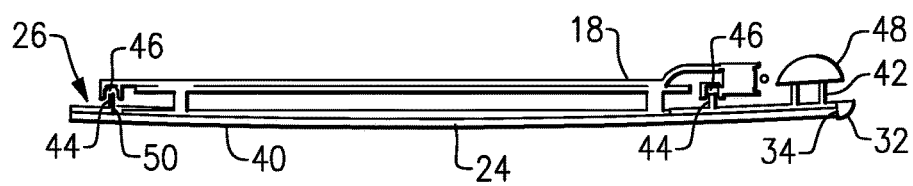
FIG. 5 is a section view as identified in FIG. 3.

FIGS. 3-5 show an example of the input device 18 in the B-pillar 12. The layer of ion treated glass 24 forms an exterior surface 40 of the vehicle 10 that is touched by the user when activating the actuation members 20 of the input device 18. The base 26 includes mounting structures 42 that facilitate assembly of the B-pillar 12 within the vehicle 10. The base 26 also includes one or more protrusions 44 that facilitate mounting the input device 18 to the B-pillar 12. In one example, the input device 18 includes a groove 46 at each lateral edge that receives the protrusions 44 to mount the input device 18 to the B-pillar 12. Each groove 46 is formed between a pair of wall extensions that extend outwardly of the input device 18. One or more foam seals 48 are mounted to the interior surface 30 of the base 26 adjacent the input device 18 to facilitate sealing an area around the input device 18.

In one example, an open window area 50 is formed through a thickness of the base 26 from the interior surface 30 to the exterior surface 28. The actuation members 20 of the input device 18 are aligned within this window open area 50 such that they are visible through the ion treated glass 24. As shown in FIG. 4, the lip 32 surrounds the outer edge 34 of the ion treated glass 24 to securely hold the glass against the base 26.

The layer of ion treated glass 24 comprises a thin form of chemically toughened glass. Examples of such glass includes Gorilla® Glass, Dragontrail™, Willow® Glass, etc. These types of glass can withstand temperatures up to 500 degrees Celsius so they is well suited for exterior high temperature applications as well as insert molding. This type of glass also has a better dielectric constant than prior pillar materials, which improves sensitivity of capacitive keyless entry buttons, for example. This type of glass is display grade, fusion-formed, and very thin glass such that it can be supplied in rolls or sheets having a thickness of 100-200 microns.

In one example, the plastic material of the base 26 is ABS (Acrylonitrile-Butadiene-Styrene), which is an opaque thermoplastic polymer material. This type of material is strong, robust, and durable even at low temperatures. This material also offers good resistance to heat and chemicals and is easy to process. The plastic material of the base 26 could also be Acrylonitrile-styrene-acrylate (ASA), or acrylic styrene acrylonitrile, which is a thermoplastic material used as an alternative to ABS as it has improved weather resistance. Other materials for the base 26 could also be used such as Polycarbonate/Acrylonitrile-styrene-acrylate (PC/ASA), which is an amorphous thermoplastic alloy of polycarbonate (PC) and ASA that provides enhanced heat resistance and enhances mechanical properties. Other similar types of materials could also be used.

Figure 6A:
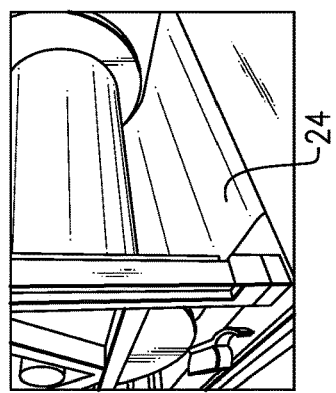
FIG. 6A shows a method step of forming the assembly of FIG. 3.
Figure 6B:
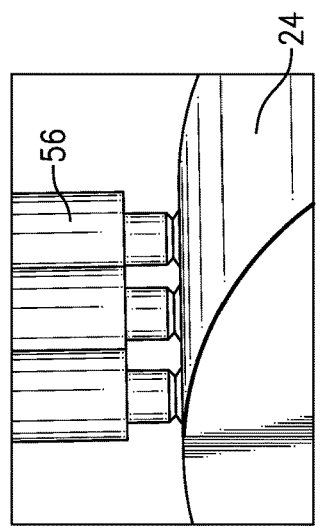
FIG. 6B is another method step.
Figure 6C:
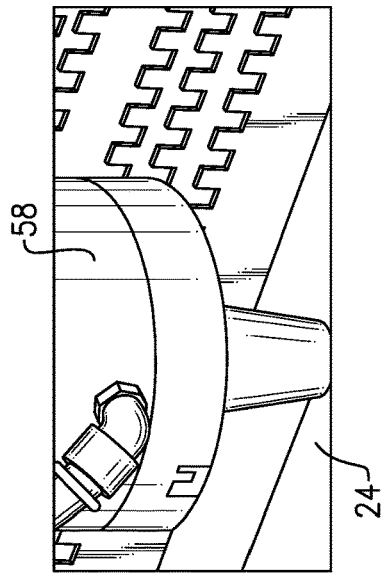
FIG. 6C is another method step.
Figure 6D:
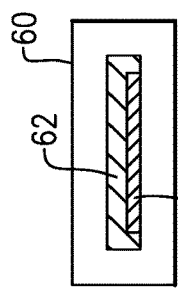
FIG. 6D is another method step.
Figure 6E:
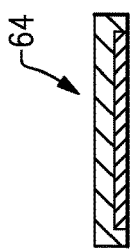
FIG. 6E is another method step.
Figure 6F:
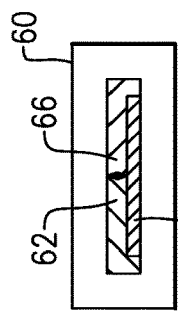
FIG. 6F is another method step.
Figure 6G:
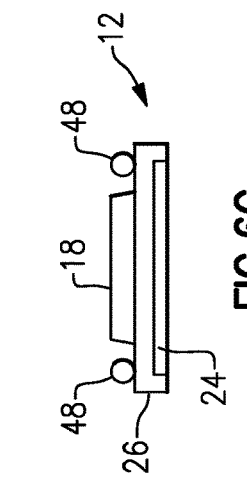
FIG. 6G is another method step.

FIGS. 6A-6G show an example method of making the pillar structure 12 shown in FIGS. 3-5. First, the ion treated glass 24 is unrolled as shown in FIG. 6A. Further, as the glass 24 is unrolled, the glass 24 is plasma treated (FIG. 6B) with a device 56 to clean and activate the surface for increased polymer adhesion during the subsequent overmold process. As shown in FIG. 6C, the glass 24 is cut to a desired size by machining or by using a laser 58 or other similar cutting process. As schematically shown in FIG. 6D, once cut to the desired shape, the layer of ion treated glass 24 is placed in a mold 60 and plastic material 62 is molded over the glass 24 to provide a completed applique 64 as shown in FIG. 6E. Optionally, a transparent acrylic material 66 can be added in a second shot of insert molding (FIG. 6F) prior to providing the completed applique. Finally, the input device 18 and foam seals 48 are attached to form a completed pillar structure 12 as shown in FIG. 6G.

The subject invention uses the ion treated glass 24 to significantly improve scratch resistance while still giving the desired transparency and "dead front" appearance for keyless capacitive entry buttons of an input device. Further, the robustness of the structure is maintained by insert molding the glass 24 in the applique to the rigid structural plastic base 26, which protects the glass from excessive stress. The use of an insert mold method of bonding the glass 24 to the plastic base 26 eliminates the need to have a pressure sensitive adhesive, which can reduce capacitive sensitivity.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. An apparatus, comprising:
   a base comprised of a plastic material, the base having an exterior surface and an interior surface;
   at least one layer of ion treated glass attached to the exterior surface, and wherein the base is molded over exterior facing outer edges of the ion treated glass; and
   at least one input device mounted to the base.

2. The apparatus according to claim 1, wherein the input device comprises a keypad.

3. The apparatus according to claim 1, wherein the base comprises a vehicle pillar.

4. The apparatus according to claim 3, wherein the vehicle pillar comprises a B pillar.

5. The apparatus according to claim 1, wherein the plastic material comprises one of ABS, ASA, or PC/ASA material.

6. The apparatus according to claim 1, wherein the interior surface includes at least one mount structure, and wherein the input device is assembled to the mount structure.

7. The apparatus according to claim 6, wherein the base includes at least one window opening, and wherein the input device is mounted to face the window opening.

8. The apparatus according to claim 7, including a foam seal attached to the interior surface adjacent to the input device.

9. The apparatus according to claim 1, including at least one foam seal attached to the interior surface and externally located from the input device.

10. An apparatus, comprising:
    a base comprised of a plastic material, the base having an exterior surface and an interior surface;
    at least one layer of ion treated glass attached to the exterior surface, wherein the layer of ion treated glass includes an interior surface, an exterior surface, and outer edges that extend from the interior surface to the exterior surface, and wherein the base includes a lip that is formed over the outer edges of the ion treated glass; and
    at least one input device mounted to the base.

11. An apparatus, comprising:
    a base comprised of a plastic material, the base having an exterior surface and an interior surface:
    at least one layer of ion treated glass attached to the exterior surface;
    a layer of transparent film between the exterior surface of the base and the layer of ion treated glass; and
    at least one input device mounted to the base.

12. An apparatus, comprising:
    a vehicle pillar body having an exterior surface and an interior surface;
    at least one layer of ion treated glass attached to the exterior surface, and wherein the vehicle pillar body is molded over exterior facing outer edges of the ion treated glass; and
    at least one input device mounted to the interior surface.

13. The apparatus according to claim 12, wherein the input device comprises a keypad that is aligned with a window opening formed within the pillar body such that the keypad is user accessible by pressing against the layer of ion treated glass.

14. An apparatus, comprising:
    a vehicle pillar body having an exterior surface and an exterior surface;
    at least on layer of ion treated glass attached to the exterior surface, wherein the layer of ion treated glass includes an interior surface, an exterior surface, and outer edges the extend from the interior surface to the exterior surface, and wherein the vehicle pillar body includes a lip that is formed over the outer edges of the ion treated glass to hold the ion treated glass against the pillar body;
    at least on input device mounted to the interior surface, wherein the input device comprises a keypad that is aligned with a window opening formed within the pillar body such that the keypad is user accessible by pressing against the layer of ion treated glass; and
    a foam seal attached to the interior surface adjacent to the keypad.

15. A method, comprising:
    providing at least one layer of ion treated glass in a desired shape;
    molding a plastic body to one side of the ion treated glass such that an opposite side of the ion treated glass forms a vehicle exterior surface;
    molding the plastic body over exterior facing outer edges of the ion treated glass; and
    assembling at least one input device to the plastic body.

16. The method according claim 15, wherein the input device comprises a keypad, and including
    forming a window opening in the plastic body,
    aligning the keypad with the window opening, and
    attaching the keypad to the plastic body.

17. The method according claim 16, including attaching a foam seal to the plastic body external to the keypad.

18. The method according claim 17, wherein the plastic body comprises a vehicle pillar.

19. The method according claim 15, including plasma treating the layer of ion treated glass prior to molding.

20. A method, comprising:
    providing at least one layer of ion treated glass in a desired shape;
    molding a plastic body to one side of the ion treated glass such that an opposite side of the ion treated glass forms a vehicle exterior surface, wherein the ion treated glass includes outer edges that extend from the side to the opposite side;
    molding a lip around the outer edges of the ion treated glass to hold the layer of ion treated glass against the plastic body: and
    assembling at least one input device to the plastic body.

21. A method, comprising:
    providing at least one layer of ion treated glass in a desired shape;
    molding a plastic body to one side of the ion treated glass such that an opposite side of the ion treated glass forms a vehicle exterior surface;
    assembling at least one input device to the plastic body;
    plasma treating the layer of ion treated glass prior to molding; and
    unrolling a roll of ion treated glass, and wherein the step of plasma treating occurs as the ion treated glass is unrolled to clean and activate a surface of the ion treated glass for increased polymer adhesion during the subsequent molding step.

22. A method, comprising:
providing at least one layer of ion treated glass in a desired shape;
molding a plastic body to one side of the ion treated glass such that an opposite side of the ion treated glass forms a vehicle exterior surface;
providing a layer of transparent film between an exterior surface of the base and the layer of ion treated glass to provide a desired color; and
assembling at least one input device to the plastic body.

23. An apparatus, comprising:
a vehicle pillar body having an exterior surface and an interior surface, and wherein the vehicle pillar body includes vehicle mounting structures;
at least one layer of ion treated glass attached to the exterior surface;
at least one input device mounted to the interior surface; and
at least one foam seal attached to the interior surface at a location between the mounting structures and an external surface of the input device.

\* \* \* \* \*